United States Patent [19]

Best

[11] Patent Number: 4,625,030
[45] Date of Patent: Nov. 25, 1986

[54] POTENTIATED NICKEL CATALYSTS FOR AMINATION

[75] Inventor: Donald C. Best, Charleston, W. Va.

[73] Assignee: Union Carbide Corporation, Danbury, Conn.

[21] Appl. No.: 613,116

[22] Filed: May 23, 1984

[51] Int. Cl.$^4$ .................. C07D 241/04; C07D 295/00; C07C 85/06; B01J 21/08

[52] U.S. Cl. .................................. 544/358; 564/469; 564/478; 564/479; 564/480; 544/352; 544/402; 502/242; 502/259; 502/261; 502/240; 502/355

[58] Field of Search ............... 564/469, 478, 479, 480; 544/352, 402, 358; 502/242, 259, 261, 240, 355

[56] References Cited

U.S. PATENT DOCUMENTS

| | | | |
|---|---|---|---|
| 3,068,232 | 12/1962 | Moss | 564/479 |
| 3,223,734 | 12/1965 | Fallstad et al. | 564/480 |
| 3,278,598 | 10/1966 | Markiewitz | 564/480 |

FOREIGN PATENT DOCUMENTS 2121697  1/1984  United Kingdom ............... 564/480

Primary Examiner—Paul F. Shaver
Attorney, Agent, or Firm—Steven T. Trinker

[57] ABSTRACT

The present invention concerns a potentiated nickel catalyst and its use for the catalytic amination of lower aliphatic alkane derivatives.

18 Claims, No Drawings

POTENTIATED NICKEL CATALYSTS FOR AMINATION

BACKGROUND OF THE INVENTION

Various methods for production of amine products have been proposed and a number of them have been commercially utilized. The present invention concerns the production of lower alkylamines by the catalytic amination of lower aliphatic alkane derivatives such as mono- and polyhydric alcohols, alcoholamines, and compounds from which these alcohols are derived, including epoxides, ketones, alkyleneamines and alkylenimines.

The catalytic amination of alcohols or amines is a process which has been long recognized in the prior art. It generally concerns the reaction of an alcohol or an amine with ammonia or a primary or secondary amine in the presence of a hydrogenation catalyst and usually in the presence of hydrogen.

The most difficult problem in the manufacture of amines by this and other proposed processes is that the chemical synthesis reactions used also form substantial amounts of by-products, which are of considerably less value and as a result often render the synthesis inefficient and not commercially feasible.

The most desirable amine products generally are those products wherein an amine group replaces the non-amine functional group or groups in the alkyl starting material without any further modification of the starting material. Most heavier, more highly substituted amines and heterocyclic nitrogen compounds can be further synthesized from these preferred alkylamines. A synthesis of these heavier, substituted and heterocyclic amines directly from the alkyl starting materials usually yields other unwanted by-products.

The amine products produced in accordance with the present invention have many uses. In addition to their use as intermediates for synthesizing other chemical materials, they are utilized, for example, in fungicides and insecticides.

For convenience in the description of the invention hereinbelow, the amination of ethylene glycol and monoethanolamine to ethylenediamine and other products will be most comprehensively discussed, although the present invention is not limited to these starting materials.

In the amination of ethylene glycol, the primary products usually are monoethanolamine (MEA), ethylenediamine (EDA), and piperazine [also termed diethylenediamine (DEDA)] and aminoethylethanolamine, (AEEA).

Numerous other chemical reactions are known for producing alkylamines. For example, in the synthesis of ethylenediamine, the following reactions have been proposed: the hydrolysis of ethylene urea; reductive amination of formaldehyde cyanohydrin; the reduction of cyanogen; the reduction of 1,2-dinitroethane; and the amination of chloroacetylchloride followed by reduction. None of these chemical processes appear to have been operated on a commercial scale because of the process requirements and costs of raw materials.

One of the most widely used commercial processes for producing ethylenediamine today involves a reaction of ethylenedichloride with aqueous ammonia. The ethylenedichloride is reacted with aqueous 30 to 40% ammonia to produce a dilute aqueous solution of amines. Sodium hydroxide is then added to neutralize the hydrochloric acid formed in the ammonia-ethylene dichloride reaction. This neutralization step forms additional water and gives rise to by-product sodium chloride. An illustration of the approximate distribution or profile of products produced by such a process is as follows:

| Products | Wt. % of Production |
|---|---|
| Ethylenediamine (EDA) | 41% |
| Diethylenetriamine (DETA) | 25% |
| Triethylenetetramine (TETA) | 10% |
| Tetraethylenepentamine (TEPA) | 8% |
| Pentaethylenehexamine (PEHA) | 13% |
| Polyamine Heavies (PAH) | 13% |
| Piperazine (DEDA) | 1.5% |
| Aminoethylpiperazine (AEP) | 1.5% |

About 2.5 lbs. of sodium chloride is produced per lb. of the amines produced.

Although the product distribution is commercially feasible, the presence of chlorine in the system, including in the corrosive form of hydrogen chloride, causes expensive maintenance costs. Moreover, recovery of the desired amine products from the salt-containing aqueous solutions is difficult and the disposal of the large quantities of salt is an ever increasing environmental problem. The cost of the starting materials also has been a discouraging factor.

A method which has recently emerged commercially is the reduction of amino acetonitrile to form ethylenediamine. Although this process, according to the literature can be operated to produce as much as 90% ethylenediamine in the amine yield, the expense of the starting materials in the process and other economic considerations do not make this process commercially attractive.

As indicated above, the catalytic amination of alkane derivatives including aliphatic alcohols, aminoalcohols or amines has been the subject of much investigation. It should be noted that there are numerous materials which have the ability to catalyze such amination processes, but the mere ability to catalyze is far from sufficient to term a catalyst of commercial significance.

U.S. Pat. No. 2,861,995 describes a method of converting ethanolamine to various nitrogen-containing products by using a metal hydrogenation catalyst comprising nickel, cobalt, copper chromite, catalytic noble metal such as platinum and palladium, and Raney nickel and Raney cobalt. They may be supported on a carrier such as alumina.

U.S. Pat. No. 3,068,290 describes a process for converting ethanolamine to ethylenediamine by using a hydrogenation catalyst, such as described above, in a reaction which is in the liquid phase, under autogenous pressure. The patent also describes a preferred catalyst which is a combination of nickel and magnesium oxides (Ni—MgO), obtained by thermal decomposition of coprecipitated nickel and magnesium formates or oxalates.

U.S. Pat. No. 3,137,730 describes the conversion of ethylene glycol by using a supported catalyst comprising nickel and copper. U.S. Pat. No. 3,270,059 teaches an amination process in the presence of a supported catalyst which is produced by sintering oxygen compounds of either nickel or cobalt at temperatures in excess of 700° C. and reducing the sintered metal compound by treatment with hydrogen. U.S. Pat. No.

3,766,184 describes a catalyst containing iron with either nickel, cobalt or mixtures thereof. Ruthenium catalysts are also referred to in this and other patents as useful in amination processes for producing aliphatic amines, e.g., see U.S. Pat. No. 2,754,330.

U.S. Pat. No. 4,209,424 discloses an amination catalyst which is stabilized with a sodium component. Example 18 of that patent pertains to a nickel, sodium and rhodium-containing catalyst, and the patentees concluded that the activity of the catalyst in the amination of ethanolamine was high due to the presence of the rhodium.

U.S. Pat. No. 4,123,462, herein incorporated by reference, discloses catalysts containing nickel and rhenium, supported on a material selected from α-aluminas, silica, silica-aluminas, silica-titanias, and kieselguhrs, or diatomaceous earths which have improved properties over those catalysts heretofore known for catalyzing the amination of aliphatic lower alkyl derivatives. Examples 9 to 12 of that patent relate to nickel-palladium catalysts. In general, these catalysts are inferior to nickel-rhenium catalysts and exhibit no clear benefit over the use of nickel alone.

Modern commercial catalytic processes require catalysts to be more than active, i.e., yield high conversions in the chemical reactions they catalyze. In the case of amination processes where numerous competing reactions occur yielding many by-products, it is important for the catalyst to have good selectivity or the ability to afford a high yield of useful product with a concomitant small yield of undesired product. The optimum reaction conditions including temperaure, pressure and relative proportions of reactants, as well as reaction time, may be determined by the catalyst, and in so doing may affect the economics of the whole process. The cost of the catalyst, its method of preparation and its effective life as well as its physical properties may be determinative of a successful, viable process.

British patent application No. 2,121,697 discloses a hydrogenation catalyst of a Raney catalyst, e.g., nickel, cobalt, chromium, copper and/or iron optionally modified with molybdenum, chromium, iron, nickel, cobalt, zirconium, copper, silver or platinum group metal, which is mixed with a nitrile and surfactant to reduce its pyrophoric properties.

SUMMARY OF THE INVENTION

This invention relates to a potentiated catalyst comprising nickel on various support materials including α-alumina, silica, silica-alumina, kieselguhr, diatomaceous earth and silica-titania which are active and selective in the conversion of various alkane derivatives to amine products. The potentiation of the catalysts of this invention is provided by the incorporation with the nickel of a potentiating amount of a metal component of one or more of iridium and platinum. Iridium is the preferred potentiating agent. It has been found that these potentiated nickel catalysts not only exhibit excellent conversion activity but at the same time have superior selectivity in the production of greater amounts of desired amine products yet comparatively smaller quantities of less desired by-products need be produced.

The potentiating agents of this invention do not appear to provide the enhancement of catalyst performance when other than nickel is used as the ammination catalyst. The reason for the unique phenomenon in respect to the ability to potentiate catalyst performance with nickel and not with other metals such as cobalt is not understood.

The nickel catalysts of this invention possess a wide spectrum in magnitude of catalytic activity; can be used in relatively small concentrations; permit the use of a better balance of reactants; and enable the use of reasonable reaction conditions for carrying out the processes.

Moreover, by controlling certain variables both in the preparation of the catalyst and in the catalytic amination process itself, the activity and selectivity of the amination reaction can be even further optimized and improved.

It has also been found that other metals may be present in the catalyst in admixture with the nickel and potentiating agent.

It has additionally been discovered that the potentiated nickel catalyst of the present invention have activity and selectivity in the amination of a wide range of alkane derivatives including, for example, epoxides, monohydric and polyhydric alcohols, ketones, alkylenimines, alkyleneamines and aminoalcohols.

DISCUSSION

According to the present invention there are provided new catalysts having high activity and selectivity in amination processes, said catalysts comprising nickel impregnated or coated together with a potentiating agent on a support material selected from alumina, silica, silica-alumina, kieselguhr, diatomaceous earth, and silica-titania, wherein the mole ratio of the nickel to total potentiating agent is in the range of from 1:1 or 2:1 to about 30:1 and the total nickel metal and potentiating agent present is in the range of about 1 to 30%, say about 3–30% by weight of the support.

Another feature of the present invention is a process for preparing said potentiated nickel catalyst, said process comprising (i) impregnating a mixture of metals comprising the potentiating agent iridium and nickel on a support material selected from the group consisting of alumina, silica, silica-alumina, kieselguhr, diatomaceous earth, and silica-titania; and (ii) activating said catalyst by heating the catalyst in the presence of hydrogen at a temperature in the range of about 200°–600° C. for a period of about 45 minutes to about 4 hours.

A further feature of the present invention is a method for producing lower aminoalkanes by the catalytic amination of lower aliphatic alkane derivatives including epoxides, alkaneols, alkanediols, alkanolamines, ketones, iminoalkanes, alkyleneamines and iminoalkanols and mixtures thereof, said process comprising contacting said lower alkane derivatives with an amination reagent which is at least one of ammonia, primary amine and secondary amine under amination conditions, e.g., including a temperature of from 125°to 350° C. and in the presence of hydrogen and the nickel catalyst as described hereinabove.

The amination process is believed to consist of a series of hydrogenation and dehydrogenation catalytic reactions. The products most often present in the reaction mixture where ethylene glycol or monoethanolamine, for example, are the starting matrials, include:
Ethylene Glycol (EG)
Monoethanolmine (MEA)
Ethylenediamine (EDA)
Piperazine (DEDA)
Diethylenetriamine (DETA)
Aminoethyl ethanolamine (AEEA)

Aminoethyl piperazine (AEP) and higher polyethyleneamines.

One of the major shortcomings in the previously known techniques in synthesizing the more desirable amine products is the simultaneous production of substantial amounts of less desirable by-products.

The production of excessive amounts of undesirable materials means an inefficient utilization of raw materials and additional problems incurred in separating the desired products from the reaction mixture and disposing of the waste products.

The support materials which have been found to produce the most active and selective amination catalysts are those supports which are composed of silica, silica-alumina, alumina, silica-titania, kieselguhr or diatomaceous earth. Most of these support materials are well-known in the art and are commercially available.

Support materials are not equivalent in their ability to form active nickel catalysts. For example, carbon-supported, potentiated nickel catalysts using CXC carbon from National Carbon Company, even with large surface areas, have not shown appreciable catalytic activity in amination reactions.

Even the aforementioned support materials which have yielded active potentiated nickel catalysts are not equivalent. Those supports which form more active catalysts yield optimum amination conversions at less severe reaction conditions, e.g., lower reaction temperatures. Therefore, although all supports tested within the group indicated above show some catalytic activity in the amination reaction, some supports within a general type have not been considered as having strong commercial promise because more extreme reaction conditions, such as higher reaction temperatures, must be used to obtain satisfactory conversions.

The actual effectiveness of a material as a support in a potentiated nickel catalyst is generally not predictable in advance. However, among the general types of supports indicated above that have been found active, there appears to be some relationship between catalytic activity and the amount of surface area of the particular support materials.

One possible explanation for the surface area effect on catalyst activity is that a number of reactions in the amination process occur on the catalyst surface and are therefore effected by adsorption-desorption equilibria of the reaction materials. The activity of a potentiated nickel catalyst would therefore be effected, within certain limits, by varying surface area of the supports and other surface properties including support shape, pore size, and pore volume. Generally, greater dispersion of the nickel and potentiating agent on the supports is desired.

Specific examples of some of the more active support materials for the catalysts of the present invention are listed in the table below:

TABLE 1

| Support | General Type | Surface Area $m^2/gm$ |
| --- | --- | --- |
| Girdler T869 | Silica-alumina | ~60 |
| Girdler T1571 | Silica-alumina | ~150 |
| Girdler T372 | α-alumina | ~40 |
| Girdler T373 | Silica-alumina | 2-3 |
| Girdler K306 | Silica-alumina | ~250 |
| Girdler T2085 | Silica-alumina | ~113 |
| Girdler K10 | Silica-alumina | ~268 |
| Girdler T2045 | Kieselguhr | |
| Norton LA 4102 | α-alumina | 1 |
| Johns-Manville | Diatomaceous silica | 10-15 |

TABLE 1-continued

| Support | General Type | Surface Area $m^2/gm$ |
| --- | --- | --- |
| Type III | | |
| Grace 980-13 | Silica alumina | ~375 |
| Grace 980-25 | Silica alumina | ~375 |
| Laboratory | Silica titania ($SiO_2/TiO_2$ Mole Ratio 9:1 to 1:9) | ~75-115 |

In the amination reactions of the present invention, supports having a surface area of 1 $m^2/gm$ or greater are preferred.

The support materials which may be used in making the catalyst may be of any convenient shape or size. The shape of the support usually will depend upon the shape required in the particular apparatus used to perform the catalyst conversion reaction. Catalysts can be made on support materials in the form of powders, spherical pellets and extruded strips. Impregnated spherical pellets ranging in diameter from ⅛ inch to 3/16 inch and extruded strips of a cylindrical-type shape ranging from 1/32 inch to ½ inch in length are typical of those which can be used as supports.

The particular method of impregnating or coating the nickel and potentiating agent onto the support material has not been found to have a significant effect on the activity or selectivity of the final catalyst in amination processes, however, impregnated catalysts generally perform better than coated catalysts. The amount of metal provided on the support material and the nature of the support itself can affect or vary the catalytic activity and/or selectivity.

One technique for impregnating the nickel and potentiating agent onto the support is to use a solution of salts of the metals as a vehicle.

Various organic and inorganic nickel and potentiating agent salts may be used in impregnation solutions. Examples of suitable nickel-containing salts are anhydrous and hydrated nickelous nitrate [hydrate: Ni($NO_3$)$_2$.6$H_2O$] and nickel acetonyl acetate [Ni($C_5H_7O_2$)$_2$]. Suitable potentiating agent salts for use in the impregnating solution are platinum (II) chloride, platinum (II) acetylacetonate, iridium (III) chloride, iridium (III) acetylacetonate. In some cases, it is advantageous to heat the solvent liquid to bring the metal salts into solution.

The salt solution should be prepared by considering two factors. The first concerns the amount of total metal desired to be impregnated on a specific quantity of support. The second factor concerns the relative atom ratio of nickel to potentiating agent. Both factors have been found to affect the final properties of the catalyst.

Some active catalysts have been found to be those in which the nickel to potentiating agent atom ratio is between 1:1 and 30:1. In most cases, maximum activity occurs with this ratio being between about 5:1 and 20:1. In preparing the catalyst, this atom ratio is obtained by predetermining the corresponding relative proportions of the metal salts to be present in the impregnation solution.

The total metal to be impregnated onto the support also has an effect on the activity of the catalyst.

The potentiated nickel catalysts in accordance with the present invention contain a total nickel plus potentiating agent metal content in the range of about 1 or 3 to 30%, e.g., about 5 to 20%, by weight of the support material.

Where relatively large amounts of metal are to be impregnated on supports, a single impregnation step may not be sufficient. Although an impregnation solution may be prepared with the minimum amount of solvent required to dissolve the metal salts, the total amount of the impregnation solution may be greater than that which the support material can absorb.

In such case, a portion of the impregnation solution less than the maximum absorption amount is used to initially contact the support material. After contacting, the support material is dried and then contacted with an additional amount of impregnation solution. The sequential steps of contacting with solution and drying are continued until all of the impregnation solution is used. A typical drying step can comprise heating the impregnated support to a temperature of 120° C. for several hours. Evacuation drying may also be used, where the support is cooled under reduced pressure.

It is also advantageous to dry the support material prior to impregnation in order to ensure that the support will take up as much of the solution as possible. This pre-drying step also enables the metal to permeate more deeply into the support during impregnation. The penetration of the metal into the support may be further increased by techniques known to those skilled in the art such as by increasing the time the support is in contact with the solution.

Other impregnation techniques are well known in the art and may be utilized in the present invention. Another technique which can be used is often characterized as a "sugar coating" technique where the metal is predominantly present on the outer surface of the support material.

This sugar coating technique differs from the impregnation process described above by the addition of a precipitant at the time the impregnating salt solution is in contact with the support material. The precipitant converts the metal salt solution into a slurry. This impregnating vehicle reduces the penetration of the salts beyond the surface of the support material. The slurry in contact with the support material is then evaporated to dryness leaving the metal adhering predominantly to the support surface.

After the support material is impregnated with the desired amount of nickel and potentiating agent, it is completely dried and then activated by a reduction step.

The drying step to be used is any technique which sufficiently evaporates the volatile constituents of the impregnating solution. The drying step may comprise heating the catalyst to a temperature of about 120° C. The drying may be done under an inert atmosphere such as nitrogen, and the catalyst may be cooled under reduced pressure.

The catalyst is then activated by a suitable step wherein the impregnated metal is converted into a catalytically-active form. This activation may include alloy formation, proper phase orientation of the metals and/or an adjustment in the oxidation level of the metals. An activation step may include a typical reduction process.

In the preferred activation step the atmosphere in contact with the catalyst is hydrogen which is fed over the catalyst at an elevated temperature in the order of 200° for 600° C. for periods of from about 45 minutes to about 4 hours. The specific conditions for reduction are dependent upon the particular catalyst composition being activated.

Prior to the activation step, the catalyst may be optionally calcined. In a preferred calcining step, the catalyst is heated to temperatures in the range of about 300° to 500° C. for 45 minutes to about 3 hours or more. It is preferred that the calcining be carried out in air. The drying step referred to above may be replaced by the calcining step or activating step.

The potentiated nickel catalysts of the present invention include catalysts which contain various other metals in admixture with the nickel and potentiating agent which do not detrimentally affect catalytic properties. These additional metals, in certain amination processes, may actually improve selectivity and activity of the basic potentiated nickel catalyst. Certain of these metals may extend the activity life and other physical properties of the catalyst. Examples of additional metal components include lanthanum, boron, magnesium, lithium, potassium, cesium, cerium, iron, ruthenium, copper, silver, zinc, cobalt, palladium, titanium, manganese, rhodium, and rhenium. In order to prepare such catalysts, salts of these additional metals are added in suitable amounts to the impregnation solution containing the nickel and potentiating agent. The amount of such additional metal components, based on nickel and expressed as an atomic ratio, is about 0.001:1 to 1:1, frequently about 0.01:1 to 0.5:1. Particularly preferred catalysts comprise nickel, iridium, and rhenium. In these catalysts, the rhenium is geneally provided in an atomic ratio of iridium of about 10:1 to 1:10.

An indicated above, the amination of alkane derivatives is a process which has been extensively investigated and is well documented in the prior art. The reaction conditions for the process to occur are generally known but are particularly dependent upon the activity of the amination catalyst present and the sought product.

The alkane derivatives which may be aminated in accordance with the present invention include lower aliphatic alkane derivatives having one or more functional groups. Preferred lower aliphatic alkane derivatives include those containing one to six carbons. The functional groups present may be on the primary, secondary or tertiary carbon atoms. At least one of the functional groups present should be capable of being replaced by an amine group in the catalytic amination process of the present invention. The preferred functional groups include hydroxy, amino, imino groups and combinations of said groups. Illustrative examples of preferred alkane derivative starting materials include ethanol, ethylene glycol (ethanediol), monoethanolamine, ethylenimine, ethylenediamine, isopropanol, propanolamines, propanediols, acetone, butanols, butanediols, aminobutanols, pentanols pentanediols, aminopentanols, hexanols, hexanediols and aminohexanols. The starting materials contemplated herein also include compounds from which the aforementioned may be derived. Preferably, at least one of the functional groups in the starting material is a hydroxy group. Other functional groups which are not replaceable during amination may be present in the alkane starting material in combination or in addition to the replaceable functional groups.

The particular alkane derivative starting materials to be used, or course, depends upon the particular amine product desired to be produced. Generally, the desired aminated product differs from the alkane starting material by the amine group which replaces the non-amine functional group or groups present in the starting material. For example, in the production of ethylenediamine starting materials include ethylene glycol and monoethanolamine. In the production of piperazine, ethylene glycol, monoethanolamine, aminoethanolamine or diethylenetriamine are also useful starting alkane derivatives. Diethylene glycol is a useful alkane derivative starting material to produce morpholine, and diethylenetriamine can be made from ethylenediamine or monoethanolamine or their mixtures as the alkane derivative.

In the amination process of the present invention, the alkane derivative starting material is reacted at an elevated temperature with an amination reactant which is one or more of ammonia, primary amine and secondary amine, (e.g., of 2 to about 6 carbon atoms) in the presence of hydrogen and the potentiated nickel catalyst. The temperature for the reaction depends upon the particular starting material, ratios of reactants, the activity of the catalyst used, and the sought products. Generally, in processes of the present invention, temperatures within the range of 125° C. to 350° C. are suitable while a preferred range is 150°-225° C. The pressure at the time of reaction should normally be within the range from about 250 or 500 to about 5,000 psig and preferably from 800 to about 4,500 psig. The reaction may occur in a single phase or in two phases where some of the e.g., ammonia and some of the alkane derivatives are present in the liquid phase and some in the gaseous phase.

The feed for the reaction may be anhydrous or may contain small amounts of water. Any water introduced into the reaction mixture with ammonia should be considered when conversion of the reaction is evaluated by the presence of water in the final mixture.

Normally, the process is run in an excess of amination reagent to ensure reaction with the amination reagent and not an amine product during the reaction. In some catalytic systems a large excess of amination reagent, especially ammonia, must be present. One advantage of the present invention is that because of the selectivity of the potentiated nickel catalyst of the present invention, only a relatively small excess of amination reagent is required.

It has been found that increasing the mole ratio of amination reagent to the alkane derivative reactant decreases the activity or conversion rate of the reaction in some reaction systems. This occurrence may be due to the fact that excessive amounts of the amination reagent will reduce the amount of surface of the catalyst available for access by the alkane derivative reactant.

When ammonia is employed in the amination processes of the present invention. It should preferably be present in an amount between 2 times and 30 times the stoichiometric amount required.

Ammonia is preferably used as the amination reagent in making ethylenediamine. In the production of ethylene diamine from ethylene glycol, monoethanolamine or mixtures thereof, ammonia is preferably present in an amount to give a mole ratio of total alcohol to ammonia in the range of 1:4 to 1:20.

Usually, hydrogen gas is added in an amount sufficient to maintain the catalyst in an active state. A preferred amination process is carried out where the hydrogen is present in an amount wherein the ammonia to hydrogen mole ratio is greater than 1 and preferably less than the ratio 1000:1.

Where selectivity to linear alkyleneamines is of primary concern in the amination process, it is preferred not to run the process to a high conversion. It has been found that selectivity to these aminoalkanes decreases as conversion increases. But if high selectivity to cyclic alkyleneamines is of primary concern, then it is preferred to run the process at high conversions.

The amination process of the present invention may be carried out in any conventional equipment. The process may be carried out as a continuous process of by batch. In continuous equipment no agitating means is required as the nature of the continuous process causes the reactants to continually flow in intimate contact with the catalyst material. Where high pressures are desired for the amination process, the equipment should have the high pressure capability.

The amount of the catalyst present in an amination process depends on many variables including the reactants, the relative proportions of the reactants, reaction conditions, and the degree of conversion and selectivity desired. Moreover, the amount of catalyst will depend also on the nature of the catayst itself, e.g., its metal loading and activity and age. In sum, the catalyst should be present in the amination reaction in sufficient catalytic amount to enable the desired reaction to occur. Often, in batch processes, about 0.001 to 0.5 milliliters of catalyst are provided per milliliter of total feed, and in continuous processes, the gas hourly space velocity based on total feed is about 5 to 100.

A TYPICAL CATALYST PREPARATION

Nickel nitrate hexahydrate, $Ni(NO_3)_2 6H_2O$, (3.9516 g) and sodium hexachloroiridate (0.4682 g) were dissolved in distilled water (18 ml). Dry, evacuated Girdler T-869 support (silica alumina) was slurried with 9 ml of solution, dried, evacuated and treated with the remaining 9 ml of solution. The impregnated catalyst was dried at 125° C., calcined at 300° C. for 3 hours, and reduced at 300° C. for 3 hours in a stream of hydrogen. The reduced catalyst was dark gray.

A TYPICAL AMINATION REACTION TEST

The catalysts were tested in a 0.5 liter rocker autoclave. In each case, the catalyst (5 gm) slurried in monoethanolamine (19 g, 0.31 mol) was charged to the autoclave. The autoclave was prepared to 200 psig with hydrogen. Liquid ammonia (71 g. 4.17 mole) was pressured into the autoclave via a Hoke cylinder. The reaction mixture was heated to the required temperature and held for the specified time. The results are shown in Table I.

TABLE I

| Test No. | Catalyst | Metals Atomic Ratio | Support | Metal Loading | Temp. °C. | Time Hrs. | % Water Prod. | EDA/DEDA Wt. Ratio |
|---|---|---|---|---|---|---|---|---|
| 1 | Ni—Ir | 13.1/1 | T-869* | 5% | 185 | 1 | 7.96** | 10.79 |
| 2 | Ni—Ir | 13.1/1 | T-869 | 5% | 200 | 2 | 22.85 | — |
| 3 | Ni—Ir | 29.5/1 | T-869 | 5% | 185 | 1 | 8.32 | 11.14 |

TABLE I-continued

| | | Conversion of Monoethanolamine To Ethylene Diamine | | | | | | |
|---|---|---|---|---|---|---|---|---|
| Test No. | Catalyst | Metals Atomic Ratio | Support | Metal Loading | Temp. °C. | Time Hrs. | % Water Prod. | EDA/DEDA Wt. Ratio |
| 4 | Ni—Ir | 25.5/1 | T-869 | 5% | 200 | 2 | 16.06 | 4.5 |

*Silica-Alumina support available from United Catalysts Inc., (formerly Girdler Division of Chemtron Corporation), Louisville, Kentucky.
**The water production is indicative of the degree of amination effected.

What is claimed is:

1. A process for aminating a lower aliphatic alkane derivative with an amination reagent which is at least one of ammonia, primary amine and secondary amine in the presence of a supported catalyst comprising reacting under amination conditions said alkane derivative with said amination reactant in the presence of hydrogen and a supported catalyst comprising a support material and nickel and iridium wherein said catalyst has a total nickel and iridium content of about 1 to 30 weight percent based on the support and the atom ratio of nickel to iridium is from about 1:1 to 30:1.

2. The process of claim 1 wherein said alkane derivative contains from one to six carbon atoms and at least one functional group capable of being replaced by an amino group by the catalytic amination process.

3. The process of claim 1 wherein said alkane derivative contains from one to six carbon atoms and at least one hydroxy functional group.

4. The process of claim 1 wherein the alkane derivative comprises ethylene glycol, monoethanolamine, and mixtures thereof and ethylene diamine is produced.

5. The process of claim 1 wherein the alkane derivative comprises monoethanolamine or ethylenediamine or mixtures thereof and diethylenetriamine is produced.

6. The process of claim 1 wherein the alkane derivative comprises diethyleneglycol and morpholine is produced.

7. The process of claim 1 wherein the alkane derivative comprises monoethanolamine or ethylene glycol or mixtures thereof and piperazine is produced.

8. The process of claim 1 wherein the alkane derivative comprises monoethanolamine and aminoethylethanolamine is produced.

9. The process of claim 1 wherein said support material is an alumina.

10. The process of claim 1 wherein said support material is a silica-alumina.

11. The process of claim 4 wherein the ammonia is present in an amount greater than the stoichiometric amount required by the alkane derivative coreactant that is present.

12. The process of claim 11 wherein the amination reagent is present in an amount in the range of 2-15 times the stoichiometric amount required by the alkane derivative coreactant.

13. The process of claim 4 wherein the amination conditions comprise a temperature of about 125° C. to 350° C. and a pressure of about 250 to 5000 pounds per square inch gauge.

14. A process for producing ethylenediamine by the catalytic amination of a compound selected from the group consisting of ethylene glycol, monoethanolamine, ethylene oxide, ethylenimine, and mixtures thereof, said process comprising reacting said compound with ammonia in the presence of hydrogen and a nickel and iridium catalyst comprising iridium and nickel impregnated on a support material selected from the group consisting of alumina, silica, silica-alumina, kieselguhr, diatomaceous earth, and silica-titania, said catalyst having a total nickel and iridium metal content of about 1 to 30% by weight of the support and a nickel to iridium atom ratio in the range of from about 1:1 to about 30:1 and wherein said catalyst is activated in the presence of hydrogen at elevated temperature, and wherein the temperature of the amination reaction is in the range 125°–350° C., the pressure is 500–5000 psig and the amount of ammonia present is in excess of 2 times the stoichiometric amount required.

15. A catalytic composition having high activity and selectivity in the amination of lower aliphatic alkane derivatives to the corresponding alkylamine, said catalyst comprising nickel and iridium impregnated on a support material selected from the group consisting of alumina, silica, silica-alumina, kieselguhr, diatomaceous earth and silica-titania wherein the ratio of nickel to iridium is in the range of from about 1:1 to about 30:1 and the total nickel and iridium present is in the range of about 1 to about 30 percent by weight of the support material, wherein said catalyst is activated by reduction in the presence of hydrogen at elevated temperature.

16. The composition of claim 15 wherein the support material has a surface area of at least 1 m²/gram.

17. The composition of claim 16 wherein the atom ratio of nickel to iridium is within the range of from about 5:1 to 20:1.

18. The composition of claim 16 wherein the total amount of nickel and iridium on said support material is in the range of from about 5 to about 20 percent by weight of the support material.

* * * * *